UNITED STATES PATENT OFFICE.

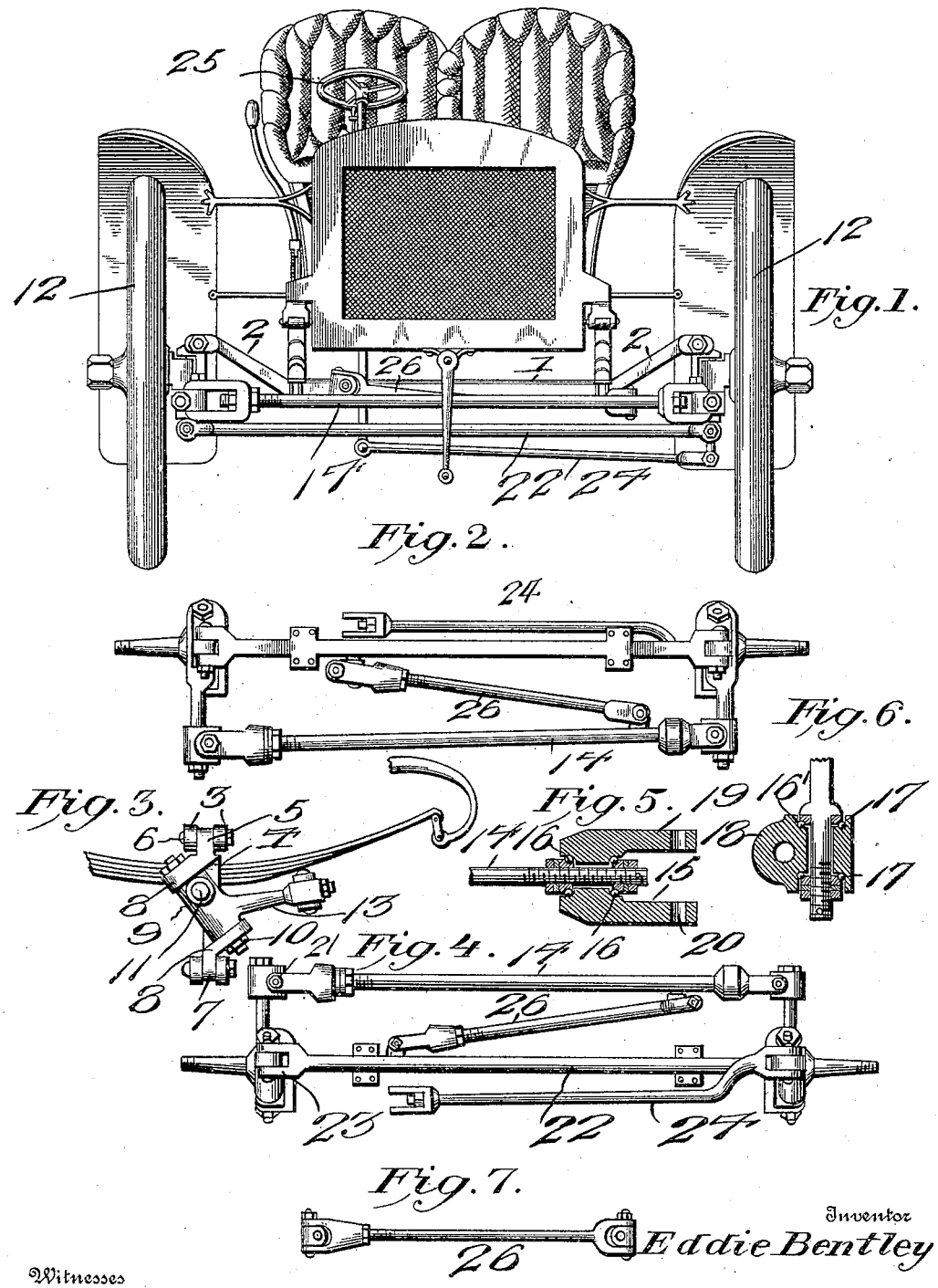

EDDIE BENTLEY, OF LINCOLN, ILLINOIS.

STEERING-GEAR.

No. 838,940.  Specification of Letters Patent.  Patented Dec. 18, 1906.

Application filed November 21, 1905. Serial No. 288,450.

*To all whom it may concern:*

Be it known that I, EDDIE BENTLEY, a citizen of the United States, residing at Lincoln, in the county of Logan and State of Illinois, have invented new and useful Improvements in Steering-Gears, of which the following is a specification.

The invention relates to an improvement in steering-gears designed, primarily, for use with automobiles and similar vehicles.

The main object of the present invention is to construct a steering-gear adapted for convenient operation from the seat of the vehicle and which in use guards the vehicle against liability of upsetting in turning sharp curves at a high rate of speed and avoids liability of tearing off the tire or snapping a wheel-axle.

The invention will be described in the following specification, reference being had particularly to the accompanying drawings, in which—

Figure 1 is a front elevation showing an automobile provided with my improved steering-gear. Fig. 2 is a plan of the steering-gear; Fig. 3, an end elevation of the same, illustrating the arrangement relative to one of the vehicle-springs; Fig. 4, a bottom plan of the gear; Fig. 5, an enlarged detail of the coupling-rod member of the universal joint. Fig. 6 is a sectional detail illustrating the steering member of the universal joint. Fig. 7 is a view in elevation of the fixed steering-rod.

Referring to the drawings, my improved steering-gear comprises a bar 1, hereinafter termed the "axle-bar," secured transverse the vehicle near the forward end thereof and preferably secured to the body-springs by any suitable device. Beyond the springs the bar inclines upwardly, as at 2, and terminates in spaced ears 3 for the pivotal reception of the wheel-bracket.

The bracket forming the support between the axle-bar and the wheel is duplicated at each end of the bar, and therefore a detail description of but one will suffice for both.

The bracket comprises a plate member 4, having at its upper end an ear 5, to be pivotally secured to the ears 3 of the bar through the medium of a bolt 6. The lower end of the plate 4 is also provided with an ear or projection 7 for a purpose hereinafter described. Intermediate the ears 5 and 7 the plate 4 is provided with spaced parallel-arranged lugs 8, positioned in a plane at an angle to the plane of the plate, as clearly shown in Fig. 3. A bearing-sleeve 9 is pivotally and rotatably supported between the lugs 8 through the medium of a pivot-pin 10, passing through said lugs and sleeve, whereby the sleeve is movably supported relative to the plate 4 and at an incline thereto, the arrangement of the lugs 8 being such that the sleeve is inclined upwardly and rearwardly relative to the vehicle-body. Wheel-spindles 11 project from said sleeve for the reception of a wheel 12, said spindle extending at a right angle to the plate 4 to support the wheel normally in vertical position relative to the vehicle-body. A steering-arm 13 projects from the sleeve 9 near the lower end thereof, said arm extending approximately at right angles to the spindle 11 and directly forward from the sleeve in the normal position of the parts.

The steering-arms 13 of each bracket are connected through the medium of a connecting-rod 14, terminally secured to each of said arms by a universal connection. This connection is illustrated in Figs. 5 and 6, and comprises a stirrup member 15, the cross-bar of which is perforated longitudinally for the reception of the proximate end of the connection-rod, a ball-bearing 16 being provided with appropriate cones, washers, and locking-nuts between the connecting-rod and member 15 to provide for relative movement with a minimum of friction. By preference the ball-bearings 16 are duplicated in opposite faces of the cross-bar of the member 15. The other or sleeve member 16' of the coupling comprises a cored body for the reception of the bearing-arm 13, spaced ball-bearings 17 providing for necessary relative movement. The sleeve member is formed with an extension 18, transversely bored and adapted to seat between the arms 19 of the stirrup member, the bore in the extension alining with openings 20 in the arms of the stirrup member for the reception of a suitable pivot-pin 21. The construction described provides a simple universal joint which will readily permit the necessary independent movement of the parts. An operating-rod 22 is terminally provided with spaced ears 23 to embrace the ear 7, depending from plate 4, whereby the plates of the respective brackets are connected for simultaneous operation. A steering-rod 24 is connected at one end to one of the brackets immediately below the operating-rod 22 and at the opposite end to the manually operated and controlling means 25 within the car, being preferably connected to a rod extending from said means. A rod 26, hereinafter termed the fixed "steering-rod," is terminally connected to the axle-bar 1 and at the opposite end to the connecting-bar 14, whereby the relative elevation of the respective wheels is secured in the operation of the gear.

Assuming the parts constructed and arranged as described, operation of the hand mechanism 25 will through the rod 24 tend to swing the brackets as a whole upon the pivotal support at 3. As the sleeves 9, however, which carry the wheels are practically fixed, owing to the connection between the bar 14 and the fixed axle-bar 1, said movement of the brackets as a whole will turn the sleeves on their pivotal supports, thus swinging the wheels at an angle to the body to provide for turning the vehicle. This operation through the pivotal mounting of the respective brackets also alters the vertical inclination of the wheels, and by the inclined arrangement of the sleeves the respective wheels will during their turning operation be caused to assume a higher or a lower plane than normal, the arrangement being such that the inner wheel of the vehicle when turning is depressed from its normal plane, while the outer wheel is elevated from its normal plane. As a result of this operation and the construction permitting same both wheels are inclined from the vertical when turning, thereby shifting the bearing contact of the respective wheels relative to the vehicle-body, the inner wheel being brought to a bearing-point almost beneath the body, so that the weight of the vehicle is maintained squarely and centrally of the rim and tire, hence rendering it practically impossible to break the tire from its connection with the rim. Furthermore the wheels are maintained at respectively different elevations when turning the vehicle, the outer wheel being on a plane higher than the inner wheel, whereby the centrifugal force incident to making the curve is compensated for in a well-known manner.

The various rods and axles of the car may be of the usual tubular or solid construction, as desired, and the connections between the respective parts may be in any preferred or desired form. The manual operating mechanism within the car may be of any of the preferred types, it simply being necessary to insure the longitudinal movement of the rod 24 to the extent desired.

The steering-gear is designed, primarily, for automobiles, but is equally serviceable in other constructions, such as steering-gears for fire-trucks or the like.

Having thus described the invention, what is claimed as new is—

1. A steering-gear comprising a fixed axle, wheel-supports, means for connecting said supports to the axle to prevent movement of the supports in one direction, and means for simultaneously swinging the supports in a direction parallel to the length of the axle, whereby the securing means insures a turning of the supports.

2. A steering-gear comprising a fixed axle, brackets pivotally connected thereto, wheel-supporting sleeves pivotally connected to the brackets, means for moving the brackets on their pivotal connection, and means for maintaining the sleeves in fixed relation to the axle.

3. A steering-gear comprising a fixed axle, brackets pivotally connected to said axle, wheel-supporting sleeves revolubly connected to the brackets, means for moving the brackets on their pivotal connections, and means for maintaining the sleeves in fixed relation to the axle.

4. A steering-gear comprising a fixed axle, brackets pivotally connected thereto, sleeves revolubly mounted at an inclination to the longitudinal plane of the brackets, means for simultaneously moving the brackets on their pivotal supports, and means for maintaining the sleeves in fixed relation to the axle.

5. A steering-gear comprising a fixed axle, brackets pivotally connected to the ends thereof, sleeves revolubly supported in the brackets, said sleeves being arranged at an incline to the plane of the bracket, wheel-spindles projecting from the sleeves, a connection joining the free ends of the brackets, said connection being operable from the vehicle, and a connection joining the sleeves, said latter connection being fixed relative to the axle.

6. A steering-gear comprising a fixed axle, a bracket pivotally connected thereto, a connection joining the bracket and operated from within the vehicle, sleeves revolubly mounted in and at an incline to the plane of the bracket, wheel-spindles projecting from said sleeves, steering-arms projecting from the sleeve, a connecting-rod, universal-joint connections between the end of the rod and the respective steering-arms, and a rod joining said connecting-rod and the fixed axle.

In testimony whereof I affix my signature in presence of two witnesses.

EDDIE BENTLEY.

Witnesses:
  S. S. HOBLIT,
  F. W. BECKER.